May 1, 1945.	E. H. BRUSETH	2,374,919
MILLING AND DRILLING ADAPTER FOR BORING BARS
Filed Sept. 9, 1943    2 Sheets-Sheet 1
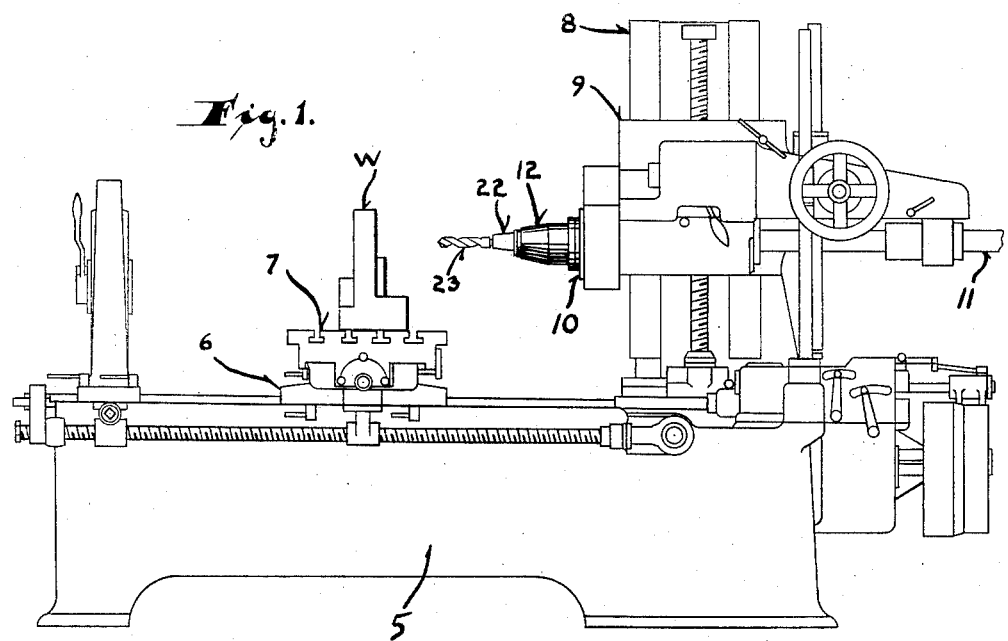
Inventor
Edward H. Bruseth May 1, 1945.  E. H. BRUSETH  2,374,919
MILLING AND DRILLING ADAPTER FOR BORING BARS
Filed Sept. 9, 1943  2 Sheets-Sheet 2

Inventor
Edward H. Bruseth

Patented May 1, 1945

2,374,919

UNITED STATES PATENT OFFICE 2,374,919

MILLING AND DRILLING ADAPTER FOR BORING BARS

Edward H. Bruseth, Milwaukee, Wis.

Application September 9, 1943, Serial No. 501,608

6 Claims. (Cl. 90—11)

This invention relates to machine tools and refers particularly to an adapter for use with boring bar machines.

These machines, or boring bars as they are generally called are primarily designed to do boring, but are also used to do drilling and milling. They consist of a bed upon which a work carrying saddle is mounted for movement lengthwise of the bed, with a work supporting table transversely adjustable thereon.

At one end a pedestal projects up from the bed and vertically adjustably mounted on this pedestal is a spindle head. The spindle of the machine is very firmly and solidly journalled in this head and has its end, which faces the work, exposed.

Slidably splined in the spindle which is hollow, is the boring bar per se. This bar can be adjusted longitudinally in the spindle to project any desired distance therefrom and is designed to have the work performing tools fixed thereto. The bar is generally equipped with a tapered bore for the reception of tapered shank tool holders to allow for the attachment of drills, milling cutters, and the like.

This has been the general scheme for many decades and perhaps from the very inception of this type of machine, but the machine has an inherent disadvantage. In order for the bar to be longitudinally adjustable in the spindle, even with the finest workmanship in building the machine, there must be some play or clearance between the spindle and bar.

As a result, it is impossble to do precision work on machines of this type and still maintain desirable production speeds. This difficulty is particularly noticeable where large diameter face millers or cutters are mounted on the end of the bar. The inevitable vibration and chattering when this setup is employed necessitates a very slow operating speed.

Likewise, when work is done by tools mounted in holders equipped with tapered shanks the past method of merely driving the shank into the tapered bore of the bar, retained not only the disadvantage of vibration, but incurred the added objection of having the holder work loose.

In addition, the necessarily small diameter of the tapered shank which could be driven into the bar constituted a serious weakness in the mounting of heavy tools and tool heads, such as the Davis boring head in which the tool holder is radially adjustable and thus swings around the center. The disproportion which thus characterized this past arrangement together with the lack of rigidity of the bar made it impossible to do high speed precision work.

The present invention is designed to overcome these disadvantages and to this end has as an object to provide an adapter so designed and constructed that it mounts accurately and securely on the exposed end of the spindle and thus is as rigid as the spindle itself.

Another object of this invention is to provide an adapter of the character described, the outer end of which is designed to have any conventional milling cutter secured thereto.

Another object of this invention is to provide an adapter which has positive means for retaining the tapered shanks of tool holders therein and for tightly drawing these shanks into position so as to preclude all possibility of vibration.

In this connection it is a further object to provide screw means actuatable from the exterior of the adapter body for pulling the tapered shanks of tool holders and attachments firmly into the adapter body.

Still another object of this invention is to provide an adapter having driving keys mounted to travel in an orbit of relatively large diameter and with which notches in the tool holders and cutters mounted on the adapter engage.

With the above and other objects in view which will appear as the description proceeds, this invention resides in the novel construction, combination and arrangement of parts substantially as hereinafter described, and more particularly defined by the appended claims, it being understood that such changes in the precise embodiment of the hereindisclosed invention may be made as come within the scope of the claims.

The accompanying drawings illustrate one complete example of the physical embodiment of the invention constructed in accordance with the best mode so far devised for the practical application of the principles thereof, and in which:

Figure 1 is a front view of a boring bar machine illustrating the application of this invention thereto;

Figure 2 is an enlarged cross sectional view through the adapter and showing the means by which the tapered shank of a tool holder is firmly drawn into position;

Figure 3 is an end view of the adapter with a part thereof broken away;

Figure 4:
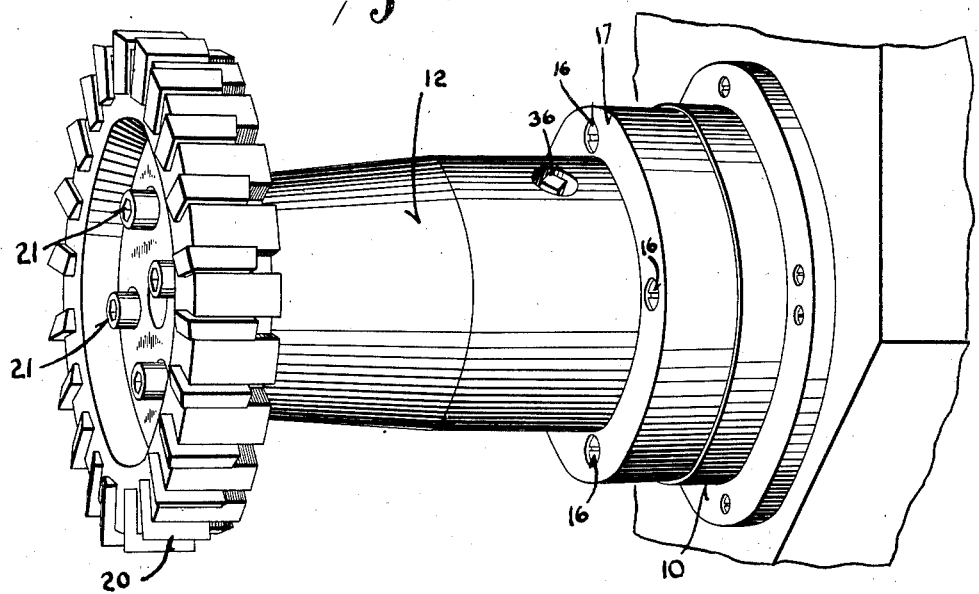
Figure 4 is a perspective view illustrating the application of a face milling cutter to the adapter.

Referring now more particularly to the accompanying drawings, in which like numerals indicate like parts, the numeral 5 designates the bed of a conventional boring bar machine upon which a saddle 6 is mounted for longitudinal travel. A work supporting table 7 is mounted on the saddle for transverse adjustment and the work "W" is adapted to be secured to this table in any conventional manner.

At one end the bed 5 has an upstanding pedestal 8 upon which a spindle head 9 is vertically adjustably mounted. This spindle head has a hollow spindle rigidly journalled therein, one end 10 of which is exposed and faces the work on the table 7.

Slidably splined in the hollow spindle is a bar 11 which in the ordinary use of the machine projects from the exposed end of the spindle to carry the cutters or other tools to be used.

Suitable mechanism is, of course, provided to drive the spindle and to effect adjustment thereof as well as adjustment of the work saddle and table, but as these parts are all conventional and have no bearing upon the present invention, they need not be explained.

For the attainment of the objectives of this invention, an adapter 12 is mounted on the exposed end 10 of the spindle in such a way that the adapter becomes substantially a part of the spindle and has its same rigidity against vibration. Consequently, tools mounted on the adapter are much more rigid than if they were mounted on the bar 11 which must have substantial play in the spindle.

It is, of course, understood that when the adapter 12 is mounted in position, the bar 11 is pulled back, but as shown in Figure 2, the bar may project into a bore 13 in the inner or rear end of the adapter body. In order to assure absolute coaxiality between the adapter and the spindle a pilot boss 14 projecting from the adapter body enters a counterbore 15 in the spindle.

Cap screws 16 or the like passing through a flange 17 on the adapter body and threaded into the end of the spindle detachably secure the adapter to the spindle.

Figure 5:
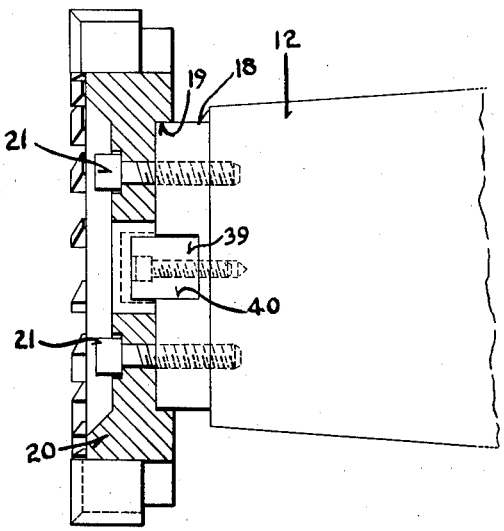
Figure 5 is a detail sectional view through the face milling cutter illustrating the way in which it is centered and mounted on the adapter.

The outer end of the adapter body has an accurately turned stepped boss 18 projecting therefrom to fit the counterbore 19 of large diameter milling cutters one of which 20 is illustrated in Figures 4 and 5. These cutters obviously take many different shapes and forms, but all of the larger sizes have the counterbore 19 and provision for the reception of attaching screws 21 by which the cutters are firmly detachably secured to the end of the adapter body. Smaller diameter milling cutters are piloted by a centering plug (not shown) seated in a tapered bore 25 in the end of the adapter body. Inasmuch as the adapter is considerably larger than the bar 11 the bore 25 is a great deal larger than the tapered bore in the bar. For instance, the bore 25 may be a No. 50 taper whereas the bore in the end of the bar is only a No. 5 taper.

This added size is of importance as it enables huskier and more rigid support to the tools.

Tools such as drills and the like are mounted by means of tapered shank holders seated in the bore 25. One such holder 22 is illustrated carrying a drill 23. Its tapered shank 24 enters the correspondingly tapered bore 25 in the adapter body, but unlike past practice is not merely driven into the bore but is positively drawn into place. For this purpose, the inner end of the shank 24 has a tapped hole 26 to receive a screw 27 which projects into the small diameter end of the tapered bore 25, which is preferably straight for a short distance as at 28. The shank 24 has a correspondingly straight portion at its extreme end.

The screw 27 is part of or secured to a shaft 29 fixed in the hub 30 of a bevel gear 31. In assembly the gear 31 is inserted through the counterbore 13 and a cavity 32 opening thereto until its shoulder 33 bears against the bottom 34 of the cavity. This supports the screw against axial displacement toward the open end of the tapered bore. Thus, upon rotation of the screw in the proper direction the shank of the tool holder or other part, such as the centering plug mentioned, is drawn firmly into place.

Rotation is imparted to the screw by means of a drive shaft 35 having a bevel gear 37 meshing with the gear 31. The drive shaft is journalled in the adapter body and extends substantially diametrically thereof. One end 36 of the shaft is exposed on the exterior of the body for the attachment of a driving handle or key (not shown), and the hub of the gear 37 bears against a flat face 38 defining one wall of the cavity 32.

A powerful and simple mechanism is thus provided for drawing tapered shanks firmly into the adapter. By reverse rotation of the drive shaft, the same mechanism can be used to force the shanks out of the tapered bore as will be readily apparent.

Means are also provided for insuring positive torque transmission from the adapter to the tool holder. To this end the adapter has one or two keys or blocks 39 mounted on its outer end and fitted in slots 40 to insure accuracy. These keys or blocks engage in notches 41 in a flange 42 on the tool holder and thereby securely lock the holder against rotation with respect to the adapter. It is to be observed that the driving keys 39 travel in an orbit of large radius, and thus provide considerably better torque transmission than was possible with past practice. Also, these keys are so positioned as to fit the driving notches of most milling cutters.

From the foregoing description taken in connection with the accompanying drawings, it will be readily apparent to those skilled in the art that this invention fills a long felt need in machine shops as it enables the ordinary boring bar machine to be used for high speed precision work which heretofore has been impossible and which is very desirable because of the many operations that can be conveniently performed on a boring bar machine.

While the invention has been described in conjunction with the conventional boring bar machine, it is to be understood that it is not limited to this specific type of machine, but is equally useful in any machine equipped with a rigidly mounted tool spindle having an exposed end.

What I claim as my invention is:

1. An adapter by which the spindle of a boring bar machine may be fitted to receive tapered shank tool holders as well as milling cutters comprising: a rigid body; means on one end of the body for centering the body on the end of the spindle; means on said end of the body by which it may be secured to the end of the spindle so that the body forms substantially an axial extension of the spindle; means on the opposite end of the body providing for properly centered attachment of milling cutters thereto, the body having a tapered bore opening to said opposite end to receive the tapered shanks of tool holders; an axial bearing within the body between and spaced from its opposite ends; a screw shaft shorter than the body, said screw shaft having a smooth portion journalled in said bearing and a threaded end portion projecting into the tapered bore to have threaded engagement with the tapered shanks of tool holders received into the tapered bore for drawing such tool holders into the tapered bore; and means drivingly connected to the screw shaft and exposed at the side of the body for actuating said screw shaft from a point adjacent to the end of the spindle to which the adapter is secured.

2. In a machine tool of the boring bar type having a spindle with an exposed end, and a work support: an adapter; complementary means on the adapter and the exposed end of the spindle for accurately centering the adapter on the spindle; means removably securing the adapter directly to the spindle so as to form a rigid extension thereof pointing towards the work support; and means for detachably securing a tool on the adapter, said last named means comprising a tool holder having a tapered shank, a tapered bore opening to the outer end of the adapter to receive the tapered shank of the tool holder, a screw journalled in the adapter coaxially therewith and projecting into its tapered bore to enter a tapped hole in the tapered shank, a drive shaft journalled in the adapter with an end thereof exposed for the attachment of a drive handle, and gears connecting the drive shaft with the screw.

3. An adapter for machine tools of the boring bar type, comprising: a body; means on one end of the body by which the body may be centered on and secured to the front end of a machine tool spindle with the body projecting axially from the spindle, the body having a tapered bore opening to the opposite end thereof and having a hollow chamber medially of its ends but spaced from the tapered bore; an axial bearing in the body connecting the hollow chamber with the inner small diameter end of the tapered bore; a screw shaft having a smooth portion journalled in the bearing and a threaded end projecting into the tapered bore to thread into a tapped hole in the end of a tool holder inserted into the tapered bore; the opposite end of the screw shaft terminating short of the adjacent end of the body so as not to interfere with the spindle of a machine tool to which the adapter body may be secured; means supporting the screw shaft against axial movement toward the mouth of the tapered bore so that rotation of the screw shaft in the proper direction draws the tool holder tightly into the tapered bore; an actuator for the screw shaft passing through the wall of the hollow chamber to be exposed at the side of the adapter body; and means inside the hollow chamber drivingly connecting the actuator to the screw shaft.

4. An adapter of the character described, comprising: a body having a tapered bore opening to one end thereof and having a hollow chamber communicating with the inner small diameter end of the tapered bore; a screw journalled in the body coaxially with the tapered bore and having its end projecting into said tapering bore to thread into a tapped hole in the end of a tool holder inserted into the tapered bore; means for supporting the screw against axial movement; a drive shaft journalled in the body and disposed substantially diametrically thereof with one end accessible at the exterior of the body for the reception of a driving handle; and meshing bevel gears on the screw shaft and the drive shaft by which rotation is imparted to the screw shaft from the drive shaft.

5. In a machine of the boring bar type having a spindle with an exposed end and a work support: an adapter having a tapered bore with its large end opening to one end of the adapter; complementary means on the opposite end of the adapter and the exposed end of the spindle for accurately centering the adapter on the spindle with the tapered bore coaxial with the spindle; means removably securing the adapter directly to the exposed end of the spindle so as to form a rigid extension thereof with the large end of its tapered bore pointing toward the work support; a tool holder having a tapered shank complementary to the tapered bore of the adapter and fitting in said bore; a screw shaft having a smooth portion and a threaded end, said screw shaft being considerably shorter than the adapter body; an axial bearing in the adapter body in which the smooth portion of the screw shaft is freely rotatable but non-longitudinally movable coaxially with the adapter with its threaded end projecting into the tapered bore and having threaded engagement with the tapered shank to draw the tapered shank firmly into the tapered bore upon rotation of the screw in one direction; an actuator for the screw shaft passing through the side wall of the adapter body; and a driving connection between the screw shaft and the actuator.

6. In a machine of the character described having a work support and a spindle with an exposed end facing the work support: an extension on the exposed end of the spindle rigid therewith and having a tapered bore coaxial with the spindle with the large end open and facing the work support so as to receive the tapered shank of a tool or tool holder, said extension also having a cavity connected with the inner small diameter end of its tapered bore; a screw shaft having a smooth portion and a threaded end, said screw shaft being axially shorter than the extension; a bearing in the extension between the inner end of its tapered bore and the cavity in which the smooth portion of the screw shaft is journalled coaxially with the tapered bore and with the threaded end projecting into the small diameter end of the tapered bore to enter and have threaded engagement with an axial tapped hole in the tapered shank of a tool or tool holder received in the tapered bore; means restraining the screw shaft against axial movement so that rotation thereof in one direction draws a tapered shank engaged therewith into the tapered bore while rotation thereof in the opposite direction forces the tapered shank outward; and actuating means within the cavity of said extension drivingly connected to the screw shaft for imparting rotation to the screw, said driving means including a handle part and exposed at the side of the extension.

EDWARD H. BRUSETH.